Sept. 13, 1955   H. SCHERENBERG   2,717,582
TWO-STROKE INJECTION INTERNAL COMBUSTION ENGINE
Filed May 18, 1951
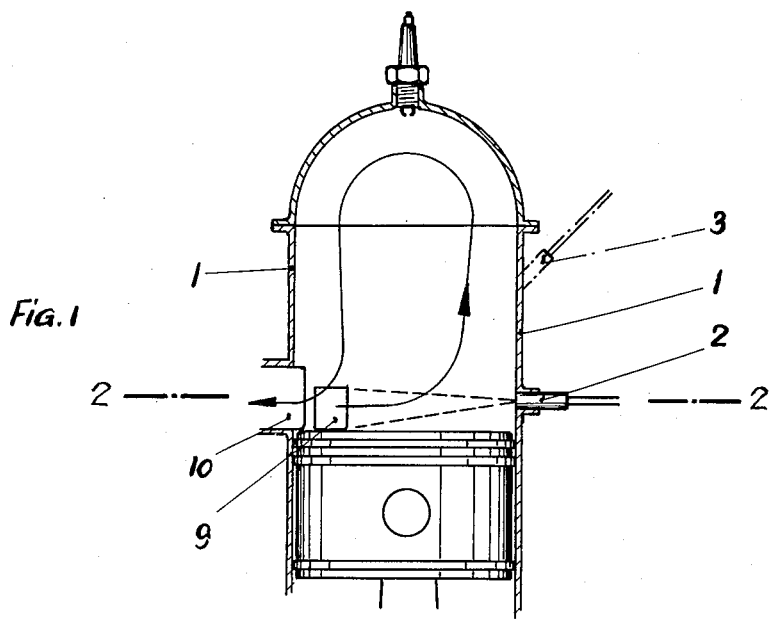
Fig. 1
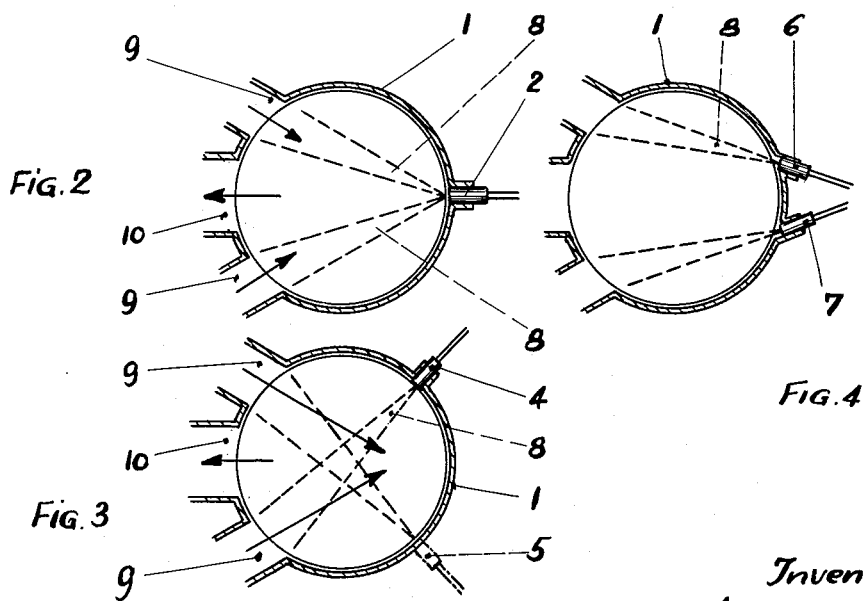
Fig. 2
Fig. 3
Fig. 4
Inventor
Hans Scherenberg United States Patent Office 2,717,582
Patented Sept. 13, 1955

2,717,582

TWO-STROKE INJECTION INTERNAL COMBUSTION ENGINE

Hans Scherenberg, Plochingen, Germany, assignor to Gutbrod Motorenbau G. m. b. H., Plochingen, Germany Application May 18, 1951, Serial No. 226,983

Claims priority, application Germany May 22, 1950

5 Claims. (Cl. 123—32)

The present invention relates to a fuel injection, spark ignition, internal combustion engine.

More particularly this invention relates to the aforedescribed type of internal combustion engine operating with a two-stroke cycle in accordance with the Otto principle. Specifically, therefore, the present invention relates to a fuel injection, spark ignition, two-stroke cycle, internal combustion engine of the port scavenged type.

It is an object of the present invention to provide a fuel injection, spark ignition, internal combustion engine operating with a two-stroke cycle in accordance with the Otto principle in which the fuel is atomized more effectively.

The present invention therefore has for a specific object to provide an internal combustion engine of the aforedescribed type including fuel injection means so disposed that the fuel path meets scavenging air streams introduced through two or more scavenging ports while the air flow velocity is high.

It is generally known in the prior art to arrange fuel injection nozzles so that injection takes place from the top of the cylinder in a direction toward the rising air stream and in which engines the spark plug is mounted in the whirling plane of the joined scavenging air stream. Under these considerations the fuel jets extend parallel to the piston path against the upwardly directed air stream.

It is also known to insert a fuel injection nozzle through the wall or cylinder so that the fuel jets that leave the injection nozzle cross the path of the piston in the cylinder when they flow into the cylinder space swept by the piston. In such arrangement the fuel jets enter from below and rise upwardly into the swept out cylinder space so that the scavenging air stream and the fuel jet have an upwardly directed component of motion.

These aforedescribed arrangements have for their purpose to assist the atomization of the fuel and to properly distribute it into the scavenging air. However such arrangements do not provide for proper fuel atomization.

Thus the present invention has for an object to provide an arrangement in which the fuel injections are directed toward the scavenging air force and are generally located on the side of the axis of the cylinder opposite to that side in which the air ports are provided. This insures that the fuel jet or jets meets the scavenging air stream or streams as soon as the latter enters the cylinder, that is, at a moment when the air current is still in stream form and has not spread and further, has a comparatively high flow velocity so that fuel is effectively atomized in the air stream.

It is also advisable to spray additionally a fuel beam in the direction towards the sparking plugs.

Further, the injection nozzle or nozzles may be so directed that the fuel jet or jets intersects the fresh air currents or parts thereof.

Further and more specific objects and advantages embodied in the present invention will be apparent from the following description taken in connection with the accompanying diagrammatic drawings in which:

Figure 1 is an axial sectional view of the cylinder of an internal combustion engine embodying the invention;

Figure 2 is a cross sectional view taken along line 2—2 at Figure 1, and

Figures 3 and 4 are views similar to Figure 2 but illustrating two additional modifications.

In the drawings, the cylinder wall 1 is provided with two scavenging air ports or passages 9 and an outlet or exhaust port 10. As particularly illustrated in Figure 2, the respective axes of the scavenging ports are at an angle to one another and in general on the same side of the cylinder wall so that the air streams denoted by the arrows will have a merging point within the cylinder but on the side of the axis thereof opposite to the location of the scavenging ports. Cylinder 1 is provided with a dome-shaped combustion chamber at the top thereof and a spark plug is mounted at the top of this dome-shaped combustion chamber. The outlet or exhaust port 10 is located intermediate the scavenging air ports 9. In order to provide for effective atomization of the fuel and consistent with the objects of the present invention, the fuel is to be injected into the cylinder in a manner such that the fuel jet or jets meets the air stream or streams going through the scavenging air ports while the air flow velocity is still high and the air stream is still confined, that is, before the stream has spread. In accomplishing this and as shown in Figure 2, the fuel injection means includes a nozzle 2 that directs two fuel jets 8 within the cylinder. Each of the fuel jets 8 is directed toward the air stream flowing in through a scavenging port 9. It is to be pointed out that the fuel injection means or nozzle 2 is directed through the wall of the cylinder at generally the same level as the scavenging air ports 9. This is clear from Figure 1. Thus it follows that since the scavenging air ports and the fuel injection means are located on opposite sides of the axis of the cylinder and at a common level, the fuel jets impinge directly on the air stream while the velocity is high so that effective atomization occurs.

In Figure 4, the arrangement of the scavenging air ports and outlet ports is the same as in Figure 2 while the fuel injection means comprises separate nozzles 6 and 7 each located to direct a fuel jet 8 into an air stream entering through a scavenging air port. Thus, in Figure 8, the nozzles 6 and 7 are located at the side of the cylinder wall opposite to that side having the scavenging air ports therein.

In the modification of Figure 3, the air streams entering through scavenging ports 9 are denoted by the elongated arrows. The fuel jets 8 are directed from nozzles 4 and 5 which are respectively located diametrically opposite the respective air ports 9 but which have their axes so directed that the fuel jets have an intersection point substantially at the axis of the cylinder while the intersection point of the air streams is located to one side of the axis of the cylinder, more particularly that side of the axis adjacent the fuel injection nozzles. This ensures that the fuel stream or jet from nozzle 5 intersects the air stream flowing through the scavenging port 9 that is lowermost in Figure 3 from the side thereof while a similar intersectional relationship of fuel and air streams is effected as regards fuel flowing from the nozzle 4 and the air stream flowing through the upper scavenging port 9, as viewed in the drawings.

It is further to be pointed out that the fuel injection nozzle 3 in Figure 1 is located above the fuel injection means 2 and directed through the wall of the cylinder from the side thereof opposite the location of the scavenging air ports and downwardly so that the fuel jet issuing from nozzle 3 will also intersect the air streams or a part thereof.

It is also advisable to locate an additional fuel injection means through the wall of the cylinder to eject fuel upwardly toward the spark plug.

I claim:

1. In a two-stroke injection internal combustion engine working on the Otto principle, a cylinder, a piston movable therein, a dome closing one end of the cylinder, a spark plug in the dome, the cylinder being provided with an air outlet opening therein, two fuel injection nozzles communicating with the interior of the cylinder in one wall of the cylinder, and the cylinder being provided with two air inlet openings therein in the opposite wall of the cylinder with the air inlet openings and the injection nozzles being disposed on a common level and directed toward one another so that the fuel leaving the nozzles is directed toward the air inlet openings whereby the fuel contacts the incoming air stream while the velocity of the air stream is high so that the fuel is finely atomized.

2. A two-stroke engine as defined in and claimed by claim 1 further characterized in that said nozzles and air inlet openings are diametrically opposed.

3. A two-stroke engine as defined in and claimed by claim 1 further characterized in that the outlet opening is located between the two air inlet openings.

4. In an internal combustion engine of the fuel injection, spark ignition type, an improvement comprising wall means defining a cylinder having at least two scavenging air ports therein, the respective axes of which are directed toward a junction point located within the cylinder, and fuel injection means directed into the cylinder from the side thereof opposite the side containing the air ports and at substantially the same level as the air ports and including means for directing fuel toward the respective air ports so that the fuel contacts the incoming air stream while the velocity of the air stream is high.

5. In an internal combustion engine as defined in and by claim 4, the cylinder including a dome-shaped combustion chamber, a spark plug at the top of said combustion chamber, said cylinder having an exhaust port intermediate the scavenging ports on the same side of the cylinder axis as said scavenging ports and the fuel injection means comprising two nozzles each projecting through the cylinder wall at a point opposite the respective scavenging port toward which they are directed.

References Cited in the file of this patent

UNITED STATES PATENTS

| 878,647 | Longnecker | Feb. 11, 1908 |

FOREIGN PATENTS

| 54,386 | France | Sept. 12, 1949 |
| | (Addition to 818,526) | |
| 818,526 | France | Sept. 28, 1937 |
| 879,443 | France | Nov. 19, 1942 |
| 879,926 | France | Dec. 10, 1942 |
| 900,146 | France | Sept. 18, 1944 |
| 905,897 | France | Apr. 30, 1945 |
| 653,125 | Germany | Nov. 15, 1937 |
| 227,217 | Switzerland | Aug. 16, 1943 |
| 233,938 | Switzerland | Dec. 1, 1944 |